June 12, 1934.  W. E. JOHN  1,962,244
CINEMATOGRAPH MACHINE
Filed July 15, 1930
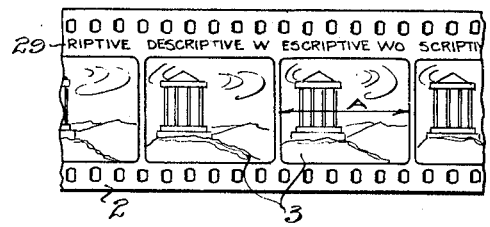
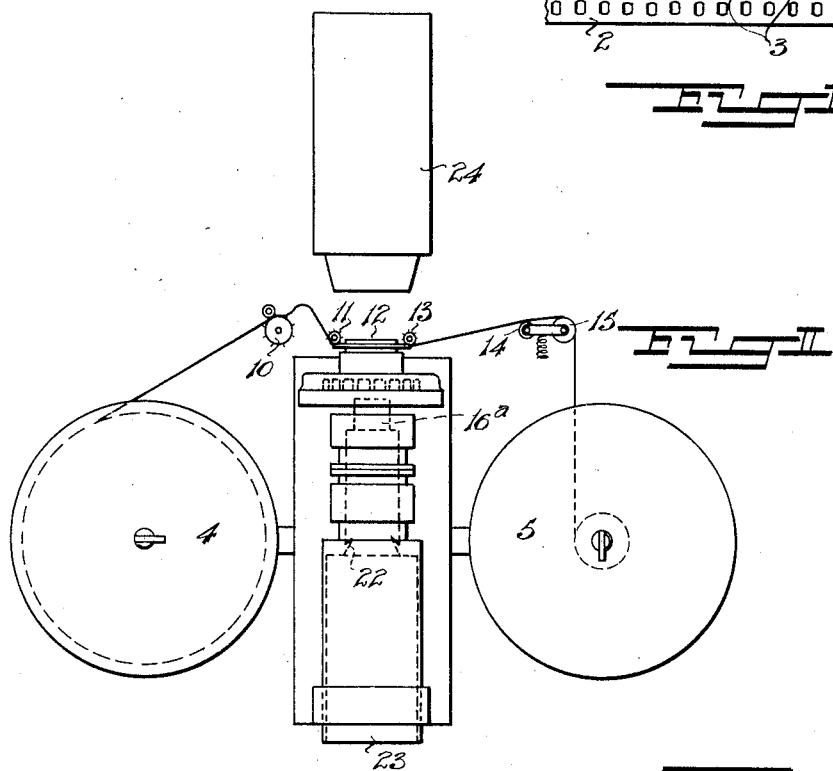
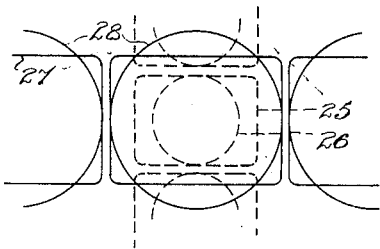
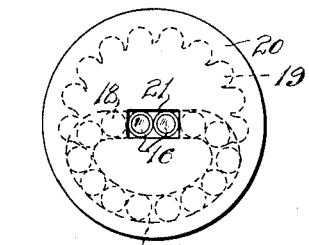
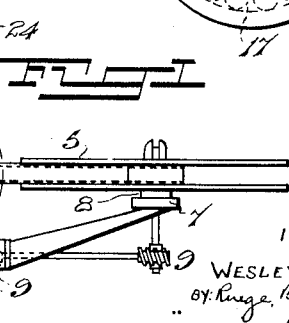
INVENTOR:
WESLEY ERNEST JOHN
ATTORNEYS.

Patented June 12, 1934

1,962,244

UNITED STATES PATENT OFFICE 1,962,244

CINEMATOGRAPH MACHINE

Wesley Ernest John, Johannesburg, Transvaal, Union of South Africa

Application July 15, 1930, Serial No. 468,005
In Great Britain November 7, 1929

1 Claim. (Cl. 88—16.8)

This invention relates to cinematograph projectors and cameras in which the film is moved continuously and in which there is provided optical means for compensating for the movement of the film, the said means comprising a series of lenses which move with the film.

In the case of a fixed objective lens co-operating with a step by step film, there is no difficulty in making the lens of sufficient diameter to cover the film frame and to transmit all the light which can pass through the frame.

Conditions however are different when there is a series of lenses moving with the film. In that case the diameter of the lens cannot exceed the pitch of the film frames, and when use is made of the present standard on which the height of the frame is its least dimension and is arranged lengthwise of the film, the lens diameter is limited to such height as its maximum. The lens area is so limited that there is difficulty in forcing sufficient light through it; and moreover the lens cannot satisfactorily cover the corners of the film frame. These drawbacks are avoided according to the present invention by employing in conjunction with a moving lens system the known type of film on which the picture frames are arranged with their greatest dimension (usually the width and hereinafter referred to as such) lengthwise of the film and by making the diameters of the moving lenses substantially equal to the width of the frames. Since the width of the frames is ordinarily greater than their height the diameter of the lenses and consequently the light transmitting capacity is correspondingly increased. The shape of the frames can be changed to elongate the frame width and the lens diameter to any desired extent. Also the width of the frame approximates more closely to its diagonal than does its height and the lens accordingly covers the corners more satisfactorily.

The invention is illustrated in the accompanying drawing as applied to a cinematograph projector.

Fig. I being a front view of the projector,

Fig. II a plan thereof, and

Fig. III an enlarged elevation of the moving lens mechanism.

Fig. IV shows a film, and

Fig. V is a diagram of a series of frames and moving lenses.

The film 2 is of the known kind having pictures 3 arranged with their width A lengthwise thereon, so that a picture of any desired width can be employed irrespective of the width of the film.

The film is fed horizontally through the camera or projector, from a feed reel 4 to a take-up reel 5. These are mounted respectively upon carriers 6, 7, so that their axes are vertical. The spindle of the carrier 7 is driven, provision being made in the usual way for slipping of the reel. Conveniently the reel 5 is merely rested on a disc 8, positively driven by mechanism 9 so that its weight sets up the desired frictional driving force between the disc and the reel, which force increases, due to the increased weight of the film, as the film coil gains in diameter.

The film is fed continuously; the arrangement for this purpose comprising a driven sprocket 10 by which the film is withdrawn from the reel 4; an idler 11 for leading the film into the gate 12; the driven sprocket or roller 13 by which the film is drawn through the gate; together with the spring supported film tensioning jockey 14 and the final guide roller 15. To compensate for the movement of the film, an optical correcting means comprising a series of moving lenses is provided; that shown being in accordance with British Patent No. 290372. It comprises a number of lens mounts 16 moved through a closed D-shaped path 17, 18. In the curve 17 of the D the mounts are carried in internal pockets 19 of the wheel 20 which is rotated positively with the film feed sprockets 10 and 13. In the straight line 18 of the D the carriers move with constant velocity equal to that of the film, and are there exposed through the aperture 21. A fixed lens 16ᵃ compensates for the movement of the film and the lenses 16. As a rule more than one picture is projected simultaneously and they are composed by the lens 16ᵃ, at the gate 22; being then projected onto the screen by the objective lens system 23. The film is illuminated by the usual means 24.

This optical system has the usual characteristic of rotating the image through 180 degrees so that no provision has to be made for a 90 degree rotation as is necessary when this type of film is fed vertically.

In Fig. V 25, 25 represent a series of frames arranged normally with their width across the film. 26, 26 indicate the corresponding moving lenses. By arranging the frames with their width lengthwise of the film as indicated at 27, 27 their size is automatically increased due to their height being equal to the width of a normal frame; and also the size of the corresponding moving lenses 28, 28, is now determined by their greater dimension, viz. their width and not by their height. The lenses 28 thus have an area and a light passing capacity greatly in excess of that of the lenses 26; whilst they more closely correspond with the diagonals of the frames. The longer the frames the more closely do the lenses correspond with their diagonals.

What I claim is:

Cinematograph apparatus comprising a horizontally guided film, means for feeding the film continuously, and optical correcting means comprising a series of lenses moving with the film the pitch of said lenses exceeding the width of the film available for picture so as to correspond with a picture frame extending with its width lengthwise of the film and wider than its height at least to the extent of a standard film frame, the lenses being of the maximum diameter consistent with such pitch.

WESLEY ERNEST JOHN.